BARR & COX.
Wheel-Cultivator.
No. 54,669
Patented May 15, 1866.
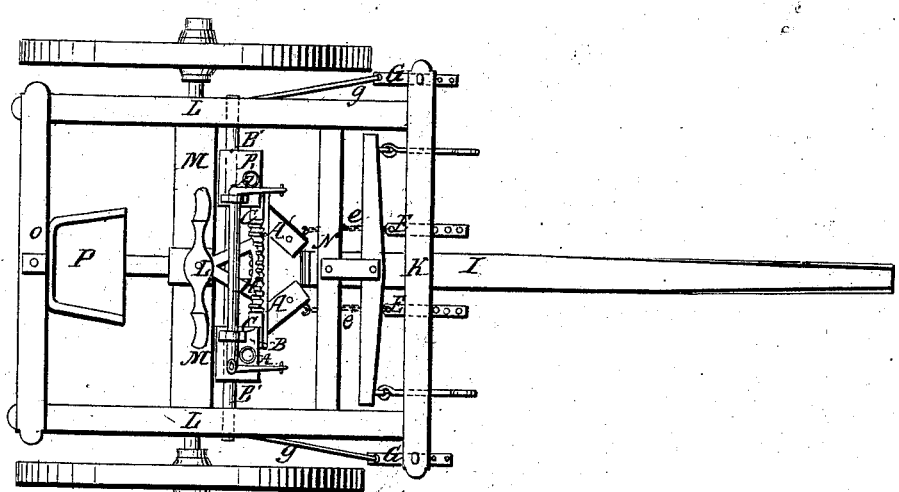
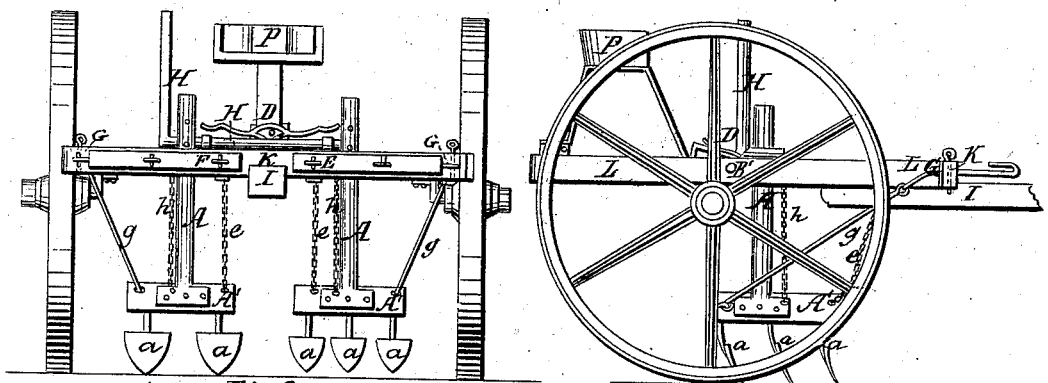
Fig. 1. Fig. 2. Fig. 3.
Witnesses:
Henry C. Russell.
D. M. Castle.
Inventor:
Orlando Barr
Franklin F. Cox.

UNITED STATES PATENT OFFICE.

ORLANDO BARR AND FRANKLIN F. COX, OF BELOIT, WISCONSIN.

IMPROVEMENT IN CULTIVATORS.

Specification forming part of Letters Patent No. 54,669, dated May 15, 1866.

*To all whom it may concern:*

Be it known that we, ORLANDO BARR and FRANKLIN F. COX, of Beloit, Rock county, in the State of Wisconsin, have invented a certain new and useful Improvement in Sulky-Cultivators; and we do hereby declare that the following is a full, clear, and exact description thereof, reference being had to the accompanying drawings, and to the letters of reference marked thereon, making a part of this specification.

Our invention relates to certain novel and useful improvements in sulky-cultivators; and it consists in a peculiar construction and arrangement of the several parts of the machine or apparatus, easy of arrangement and cheaply constructed, whereby the operator (riding on the machine) can control the working in the field in the most perfect manner and with great ease and convenience, raising or lowering the plows or teeth to suit irregularities in surface of the ground, to avoid roots or rocks, and prevent wear or injury going to or returning from work. By lateral motion of the shovels crooked rows may be cultivated without disturbing the plants, the earth thrown to or from the hills, or obstructions avoided as aforesaid.

To enable those skilled in the art to make and use our invention, we will proceed to describe the same, referring by letters to the accompanying drawings, and in which—

Figure 1 is a perspective view. Fig. 2 is a vertical section nearly in line of the axle from from right to left, and Fig. 3 is a side section view.

In the several figures the same letters of reference indicate the same parts of the machine.

A' A' are the beams, to which the cultivator teeth or shovels $a\ a$ are attached, as shown at Figs. 2 and 3; B' B', the stationary round rod passing through the movable head-blocks B B. The ends of said round rod B' B' are inserted through and secured to the sides of the frame L L, as shown, to which is attached the rocking-shaft H, having the vertical lever H', the gear C C, and adjustable sliding rods A A, secured to the said beams A' A', as shown. By the use of the vertical lever H', actuating the rocking shaft H, to which are attached the chains $h\ h$, the shovels or teeth are lowered or raised to suit the work in hand at the pleasure of the operator.

D is a a foot-lever and section-pinion actuating the said gear C C, whereby the driver, occupying the seat P, as shown, may cause the said head-blocks B B and apparatus connected therewith to move suddenly and rapidly laterally from right to left, or vice versa, to accommodate crooks in rows or hills of growing corn and to throw the earth to or from the hills or rows, or to avoid obstructions, as the case may require. The said foot-lever and section-pinion D are secured to the cross-beam M M of the frame, as shown.

$g\ g$ are draft-rods, connected by hooks and eyes to the rear ends of the said beams A' A', holding said rear ends thereof from contact with the wheels. Also, when the said beams are raised by the lever H' the said rods $g\ g$ cause the front ends of the said beams A' A' to spread open, thereby avoiding obstructions. The forward ends of said rods $g\ g$ are connected in the same manner to thin flat bars which pass horizontally through the ends of the front bar, K, of the frame, or to iron brackets attached to the lower side of said bar K of the frame, extending down twelve inches, more or less, thereby lowering the front ends of the rods $g\ g$ and chains $e\ e$, bringing them nearer to the line of draft. The said flat bars on the front ends of rods $g\ g$ have several holes, through any one of which pins are inserted through the said bar K of the frame, or similarly to the said brackets. Said rods are thereby extended or taken up, so that, in connection with the said draft-chains $e\ e$, the forward ends of which have a similar fastening as said rods $g\ g$ to said frame K, or to said brackets, the forward ends of which are let out and taken up in the same manner, so that the said beams A' A', on which are the said teeth or plows $a\ a$, may be placed in any desired angle to the rows or hills to be cultivated, as shown at Fig. 1. The flat bars which are inserted through the said frame K or the said brackets, and form part of the said draft-chains $e\ e$, are held in position by wooden pins through the said holes in said bars and in front of the said frame K or said brackets, so that in case the plows come in contact with any heavy or fixed obstruction, such as stumps or rocks, the said pins will at once break, and no possible injury can happen to the machine.

It will be understood that our invention exactly supplies a great want in the farming interest of the country, furnishing a cultivator incomparable in cheapness of manufacture, simplicity of construction and arrangement, durability, and adaptation for work in smooth or rough ground.

Having thus described the construction and arrangement of our improved machine, in connection with the accompanying drawings, so that one skilled in the art could make and use the same, what we claim as new, and desire to secure by Letters Patent, is—

The rod B' B', as shown in Fig. 1, the head-blocks B B, sliding upon the said rod B' B', connected with the gear b b, and foot-lever and section-pinion D, the sliding rods A A, attached to the beams A' A', and the device and arrangement of the draft-rods g g and chains e e, when constructed substantially as and for the purpose herein set forth and described.

<div style="text-align:right">ORLANDO BARR.<br>FRANKLIN F. COX.</div>

Witnesses:
  D. W. C. CASTLE,
  CHAS. O. TATTERSHALL.